Nov. 28, 1933.  L. NIEMEYER  1,937,159
POTATO HARVESTING MACHINE
Filed Dec. 31, 1931   2 Sheets-Sheet 1
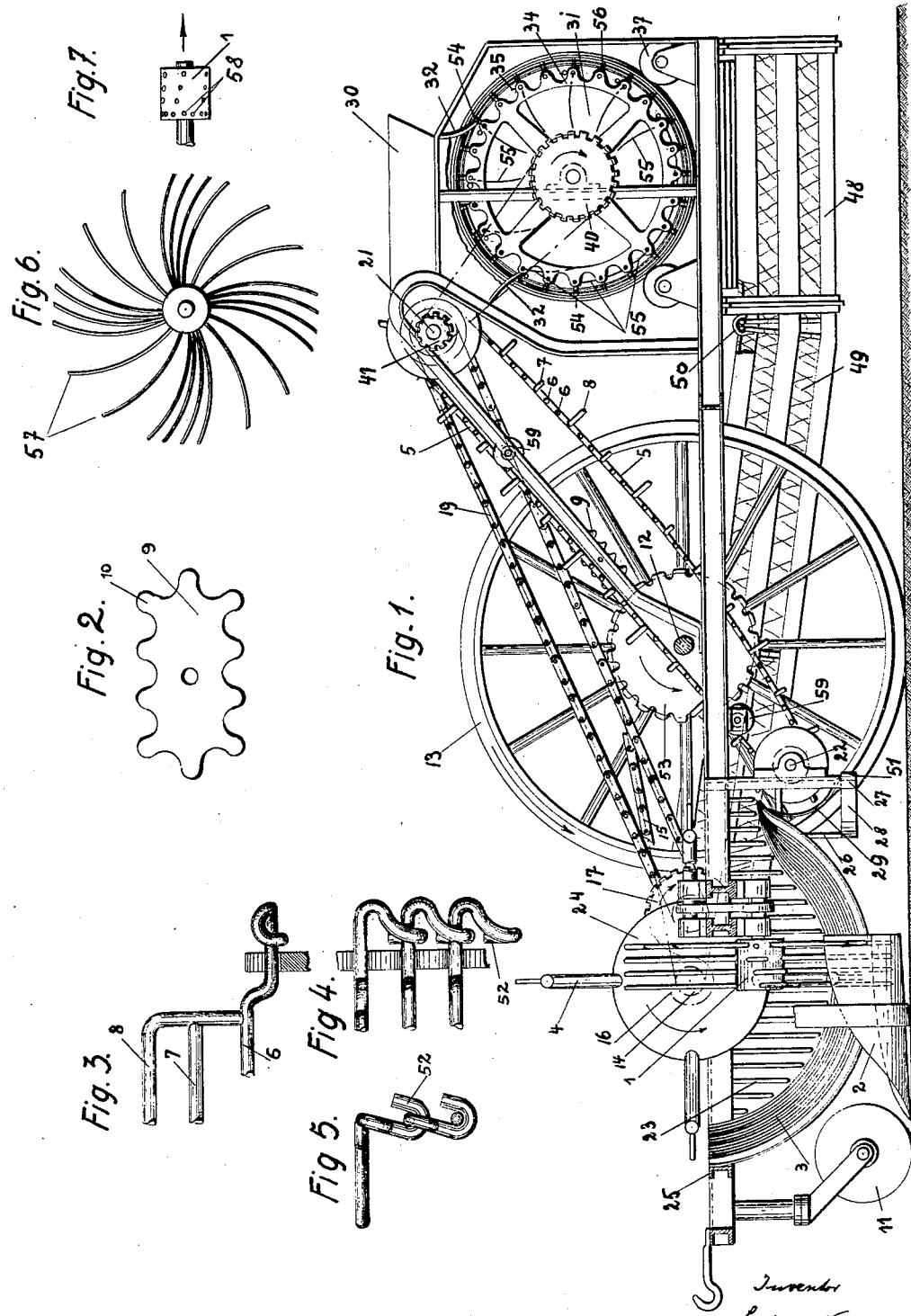

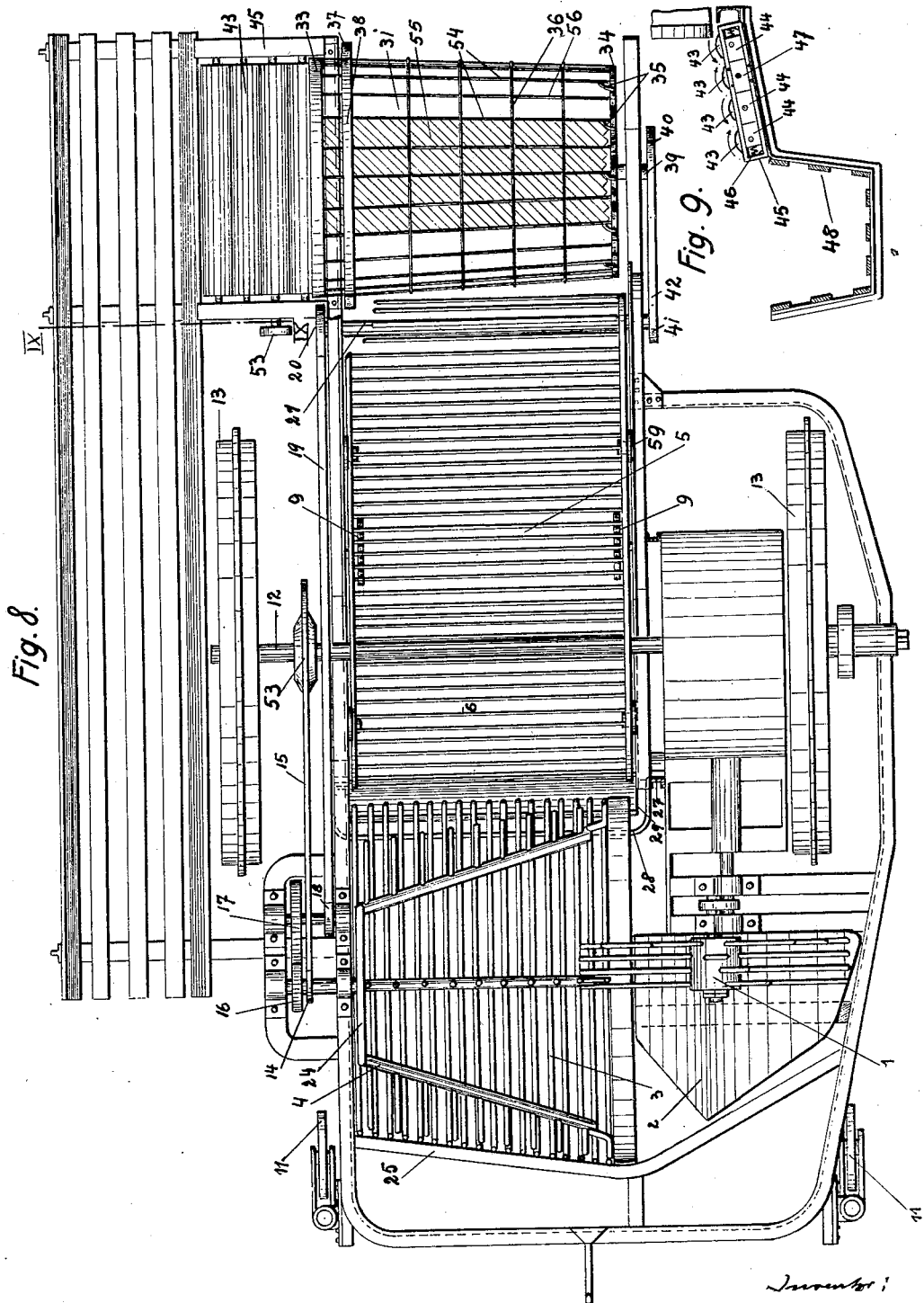

Patented Nov. 28, 1933

1,937,159

UNITED STATES PATENT OFFICE 1,937,159

POTATO HARVESTING MACHINE

Ludwig Niemeyer, Oese, Germany

Application December 31, 1931, Serial No. 584,123, and in Germany January 12, 1931

4 Claims. (Cl. 55—56)

The invention relates to a potato harvesting machine with shovel wheel and elevator arranged behind the share.

In machines of this type it is known to arrange between a rotatable shovel wheel extending above a grate transversely to the direction of travel and an elevator, a collecting box, the bottom of which consists of a shaking grate, and the side wall of which opposite the shovel wheel consists of inclined, resiliently arranged tubular rods, whereas the rear wall is formed by the elevator. From the elevator extends a device for removing the stalks and leaves and then another grate through which the potatoes drop into a basket.

Such machines possess the inconvenience, that only a portion of the earth is conducted through the collecting box, the largest portion of the same arriving together with the potatoes and the stalks and leaves in the elevator, where the adhering earth cannot be removed. Also the potatoes can not be completely freed from earth and stalks and leaves on the next following grate and on the rollers for removing the stalks and leaves.

In potato harvesting machines with a shovel wheel rotating transversely to the direction of travel it has further become known to arrange a second shovel wheel at the side of the first one and parallel to the direction of travel. This second shovel wheel is shut off by a baffle disc or grate and the rows of arms or tines arranged around the axle are constructed roll like.

The potatoes thrown off by the first shovel wheel fall with the adhering earth into the interval between two rows of tines of the second shovel wheel and either drop on to the ground or are gripped by the lower row of tines and thrown in backward direction. As however the rows of tines are situated in the direction of throwing, the potatoes slide along the tines and assume, as at the same time a push in the furrow direction is imparted to them by the rotating rows of tines, a direction of movement, which forms with the furrows an angle of approximately 45°; only several potatoes, which have been thrown far and recoil from baffle surfaces, are moved to the rear in the direction of the furrows. As at the first centrifuging the greatest number of the potatoes do not strike against a baffle surface, but slide on the rows of tines, the separation of earth from the potatoes designed to be attained by the first shovel wheel does not take place in full measure. The potatoes are deposited by the second shovel wheel in a flat curve and also here no baffle surface is provided and, when the weather is moist, the danger exists that the potatoes rolling over the ground are enveloped by earth. No means are provided for collecting the potatoes.

Machines are further known, in which the potato ridge is conveyed into a trough-like grate forming the extension of the share and thrown by means of a shovel wheel against a stationary grate or against a bucket elevator. Also in such a machine perfect separation of the earth and of the stalks and leaves from the potatoes does not take place.

According to the invention a collecting trough enlarging towards the shovel wheel is provided, from which the potatoes are thrown, by means of a shovel wheel rotating in the trough, in rearward direction against an endless grate, from which extends a transverse sorting drum with movable wall strips, underneath which drum and in the extension of which stalks and leaves removing rolls are arranged rotating in pairs in opposite directions and situated in an inclined plane, from which rolls the potatoes slip into baskets on the side of the machine, the grate, ascending approximately in the direction of throw, having webs standing perpendicular to the direction of throw and serving as baffle surfaces. In order to prevent the potato ridge from slipping through the first shovel wheel, the side of this shovel wheel facing the share has a great number of tines forming a shutting off grate and situated all in one plane. A rectangular disc is further rotatably mounted underneath the grate, at the side of the same, which has tines engaging between the bars of the grate and lifts and lowers this grate jerkwise. The grate consists of bars. The inwardly bent end of each bar forms a hook, into which the adjacent bar is hooked. The grate bars are further slightly bent in upward direction so that, when passing the reversing points, they move the one away from the other and liberate potatoes which might be clamped between the bars. The conically enlarged sorting drum is surrounded on the outer side by carrying rings designed to receive the stalks and leaves, and the wall of this drum is formed by longitudinal rods journaled in the rims of the drum and serving as carriers for inwardly situated obliquely extending wires which form the drum wall proper and which, in the closing position, bear against stationary rods, the rotatable longitudinal rods having abutments designed for limiting the rotating movement. In order to remove the last remainders of the stalks and leaves the material rolls over stalk removing rolls situated in one plane, the rolls of each pair rotating in opposite directions, and all the rolls being inclined, so that the potatoes roll over the same whereas the stalks and leaves remain on the rolls and are discharged in downward direction. The wide-meshed baskets designed to collect the potatoes are mounted in a groove at the side of the machine and have bows which grip on the end face over the basket rim.

Numerous experiments have shown that for stalks about 50 cms. high it is not necessary to previously remove the stalks in any manner. The machine separates the stalks and leaves and earth from the potatoes and gathers up to 99% of the potatoes in the ground. The necessary power for the machine can be supplied by three medium heavy or two heavy horses. Potato stalks of greater height must be mowed or previously removed with suitable machines.

An embodiment of the invention is illustrated by way of example in the accompanying drawings in which Fig. 1 is a side elevation of the machine.

Fig. 2 shows the shaking disc.

Figs. 3, 4 and 5 show the bars of the endless grate.

Fig. 6 shows in front end elevation the main shovel wheel.

Fig. 7 shows the hub of the shovel wheel with the bores for the tines, the arrow indicating the direction of draught.

Fig. 8 is a top plan view of the machine, some of the wires of the drum being omitted for the sake of clearness.

Fig. 9 is a section on line IX—IX of Fig. 8.

In the potato harvesting machine a shovel wheel 1 is situated above a share 2 which lifts out the potato ridge. The several tines in one row of tines in the shovel wheel 1 are arranged mutually ahead, the tines digging last into the ground in the direction of travel forming a grate with the interposed tines 57. Fig. 7 shows the bores 58 for the tines 57. The arrow in Fig. 7 indicates the front of the shovel wheel 1 in the direction of draft. At the side of the shovel wheel 1 an upwardly inclined catching trough 3 is arranged, in which a tine wheel or second shovel wheel 4 rotates. An endless grate 5 upwardly inclined in the direction of throw and arranged behind the collecting trough 3 consists of bars 6 bent off in downward direction at the ends and carrying webs 7 and 8 spaced at suitable distances and arranged at different height serving as baffle surfaces. The inwardly bent ends of the bars form hooks 52, in which the adjacent bars are hooked. Under the endless grate 5, near each outer side, a rectangular disc 9 is situated, the teeth 10 of these discs 9 engaging between the bars 6 and webs 7 and 8 to jerkwise lift and lower said grate 5. The machine is transportable and mounted on two small wheels 11 and on two large wheels 13, the latter mounted on an axle 12. The shovel wheel 1 is driven from the axle 12 through the intermediary of a bevel wheel gearing whereas the shovel wheel 4 is driven from the axle 12 through sprocket wheels 53 and 14 by a chain 15. The grate 5 is driven through spur wheels 17 and 18, a chain 19 and a spur wheel 20, which is keyed on a shaft 21 connected with a lower shaft 22 by the grate 5. The collecting trough 3 is closed at the side by a grate 23 and partly covered with a baffle disc 24 of the tine wheel 4, the bars of the grate 3 being welded at one end to the machine frame 25, whereas the other end of each bar is supported by a rod 26 resting on a flat iron 28, fixed to a U-bar 27. On the U-bars another flat iron 51 is fixed, to which a shield 29 is connected. On the upper portion of the endless grate 5 a sheet metal chute 30 is arranged, through which the potatoes with the stalks and leaves drop on to a sorting drum 31, a guide plate 32 being provided which extends parallel to the feed direction of the material and on the supporting construction in vertical direction partly covering laterally the open end wall of the drum so as to prevent the material from dropping out at the small end of the truncated conical sorting drum. Such a guide plate is not necessary on the opposite large end because the sorting drum rises towards this end and extends beyond the side of the grate 5. The drum 31 is formed of longitudinal rods 54 journaled in the rims 33 and 34 of the drum and having each a finger-like abutment 35, designed to limit the rotation of the rod to about 90°. Obliquely extending wires 55, loosely lying on fixed rods 56, are rigidly connected with the rods 54 and form the wall proper of the drum 31. Wire rings 36 are placed around the wires 55. The long stalks drop on to these wire rings 36 and on to the longitudinal rods 54 and 56 and they are removed during the rotation of the sorting drum 31, whereas the potatoes drop through between the same. The drum has a running ring 38 rolling on two wheels 37 and an axle 39 driven from the shaft 21 through the intermediary of spur wheels 40 and 41 and chain 42. Four rolls 43 are pairwise arranged under the rim 33 of the drum, the rolls in each pair rotating in opposite directions. The bearings 44 of these rolls 43 are mounted shiftable in longitudinal direction in the machine frame 45 and by the pressure of a spring 46 secured in their adjusted position, the bearings 47 being rigidly connected with the frame 45. The remaining rolls, owing to the shiftability of the bearings in the coordinate frame 45 can yield so that gaps are produced between the rolls through which gaps the stalk, roots, soil and the like can be led off. The rolls driven by a toothed wheel 53 are situated in a plane which is inclined at such an angle that the potatoes can easily roll over them, whereas the stalks and leaves remain on them and are pulled downwards by the rolls.

As the shaking angles of potatoes and stalks and leaves are very different, the most favourable position of the rolls 43 can be easily ascertained.

A grate 48 composed of laths, designed to support coarse meshed wire baskets 49, extends from the rolls 43, at first inclined and then parallel to said rolls. The one end face of each basket carries a U-shaped bar 50 designed to grip over the end face of another basket.

The operation of the potato harvesting machine is as follows:

The share 2 lifts up the potato ridge, which is thrown by the shovel wheel 1 into the collecting trough 3 and strikes partly against the grate 23 or baffle disc 24. A great portion of the earth deposits already in the collecting trough. The material is then thrown by the shovel wheel 4 against the upwardly inclined travelling grate 5 and recoils from the webs 7 and 8 standing perpendicularly to the direction of throw. By this second striking the potatoes are completely freed from earth, the earth dropping through the gaps between the grate bars. The grate 5 during its movement is raised and lowered jerkwise by the discs 9 so that the last traces of earth drop off the potatoes. The potatoes drop then through between the bars 54 and 56 and the wire rings 36 of the sorting drum 31 into this drum, whereas the stalks and leaves settle on the outer side of the drum and drop off during the rotation of this drum. The potatoes dropping into the sorting drum 31 strike against the wires 55 which, owing to the displacement of the centre of gravity, bear against the stationary rods 56 and the potatoes are conducted by these wires in outward direction and slip over the rolls 43 into the basket 49. If the basket 49 is full one end of the same is held, the grate 48 continues to move with the machine, the higher basket being pulled down by the bow 50, and the full basket being pulled out from the grate 48 so that it drops vertically on to the ground.

I claim:—

1. A potato harvesting machine, comprising in combination with the share for lifting the potato ridge, a rotatable shovel wheel above and extending into said share, a collecting trough above said share designed to receive the potato ridge, a second shovel wheel rotating in said trough, an endless travelling grate above said collecting trough adapted to receive the material from said second mentioned shovel wheel, a sorting drum extending transversely to the direction of travel arranged behind and under the rear end of said travelling grate, a set of stalks and leaves removing rolls arranged in pairs at the delivering side of said sorting drum the rolls in each pair rotating in opposite directions, all said rolls situated in a downwardly inclined plane, and baskets at the side of the machine designed to receive the potatoes from said rolls.

2. A potato harvesting machine as specified in claim 1, comprising in combination with the share the collecting trough and the shovel wheel rotating in said trough, a number of vertical bars situated in one plane on the side of said shovel wheel remote from said share and forming a shutting off grate for said collecting trough.

3. Potato harvesting machine as specified in claim 1 in which the bars forming the travelling grate have inwardly bent ends forming each a hook, in which the adjacent bar is hooked, said bars being bent upwards so that, when passing the reversing points, the distance between said bars is considerably increased and potatoes clamped between said bars are liberated.

4. A potato harvesting machine as specified in claim 1, comprising in combination with the sorting drum conically widened in the discharging direction, carrying rings surrounding said sorting drum designed to carry the potatoes, stalks and leaves, longitudinal rods rotatably mounted in the rims of said drum, oblique wires loosely arranged under said longitudinal rods forming the wall proper of said drum, stationary longitudinal rods fixed in the rims of said drum adapted to support said loose wires in the closing position, and a finger-like abutment on one end of each of said rotatable longitudinal rods adapted to limit the rotation of said rods.

LUDWIG NIEMEYER.